(12) United States Patent
Tangri et al.

(10) Patent No.: US 7,555,518 B2
(45) Date of Patent: Jun. 30, 2009

(54) RELATIVE QUALITY VALUE

(75) Inventors: Manish V Tangri, Redmond, WA (US);
David S Callahan, Mukilteo, WA (US)

(73) Assignee: Microsoft Corporation, Redmond, WA (US)

( * ) Notice: Subject to any disclaimer, the term of this patent is extended or adjusted under 35 U.S.C. 154(b) by 983 days.

(21) Appl. No.: 11/050,951

(22) Filed: Feb. 4, 2005

(65) Prior Publication Data

US 2006/0179108 A1 Aug. 10, 2006

(51) Int. Cl.
*G06F 15/16* (2006.01)
*G06F 12/00* (2006.01)

(52) U.S. Cl. .................................. 709/203; 709/224

(58) Field of Classification Search .............. 709/203, 709/223, 224, 229, 250
See application file for complete search history.

(56) References Cited

U.S. PATENT DOCUMENTS

| 6,078,568 | A | * | 6/2000 | Wright et al. | ............ 370/312 |
| 2003/0005023 | A1 | * | 1/2003 | Gilbert et al. | ............ 709/101 |
| 2003/0134637 | A1 | * | 7/2003 | Cooper | .................. 455/432 |
| 2003/0167294 | A1 | * | 9/2003 | Neuman | ............... 709/102 |

* cited by examiner

*Primary Examiner*—Zarni Maung
(74) *Attorney, Agent, or Firm*—Lee & Hayes, PLLC (57) ABSTRACT

Relatively quality value is described. In an implementation, a method includes calculating a mean success rate for a plurality of products utilized by a plurality of clients. For each of the products, a degree is determined, to which, either a first set of the clients or a second set of the clients predominate. The first set of clients have a success rate that is greater than or equal to the mean success rate and the second set of clients have a success rate that is less than or equal to the mean success rate. For each of the products, a relative quality value is calculated based on the mean success rate and the determined degree.

19 Claims, 6 Drawing Sheets

RELATIVE QUALITY VALUE

TECHNICAL FIELD

The present invention generally relates to a determination of quality for a product and more particularly relates to a relative quality value.

BACKGROUND

Access numbers are still utilized by a wide range of users to access content from over a network. For example, a user may utilize a laptop computer having a modem that is configured to achieve a dial-up connection with an Internet service provider, and thereby gain access to the Internet. Through use of the laptop computer, the user may gain access to the Internet from a wide variety of locations by achieving a communicative coupling with the Internet service provider. The user may also utilize a wide variety of other computing devices to access the Internet service provider, such as a desktop personal computers, a personal digital assistants, a wireless phone, and so on.

Because of the wide range of locations that may be utilized by the user, the Internet service provider may have a plurality of access numbers which are available for access by the user from differing locations. Additionally, because a large number of similar users may also desire access, the Internet service provider may include a plurality of access numbers for access at each of the differing locations. Accordingly, the Internet service provider may have a multitude of access numbers that may be utilized by the large number of users from the differing locations utilizing the wide variety of computing devices. However, the Internet service provider may not be able to determine relative quality of the access numbers because of the multitude of access numbers and the differing computing devices that may be utilized to access the access numbers from the wide variety of locations. Therefore, the Internet service provider may not be able to determine which access number should be utilized by a given user.

Therefore, there is a continuing need for determination of access number quality.

SUMMARY

A relative quality value is described. In an implementation, a method includes calculating an access success rate for a plurality of clients for utilizing an access number to access a service provider. A first set of the clients have respective access success rates that are greater than or equal to the access success rate. A second set of the clients have respective access success rates that are less than or equal to the access success rate. The access success rate is adjusted based on a degree, to which, either the first set of the clients or the second set of the clients predominate.

In another implementation, a method includes calculating a mean success rate for a plurality of products utilized by a plurality of clients. For each of the products, a degree is determined, to which, either a first set of the clients or a second set of the clients predominate. The first set of clients have a success rate that is greater than or equal to the mean success rate and the second set of clients have a success rate that is less than or equal to the mean success rate. For each of the products, a relative quality value is calculated based on the mean success rate and the determined degree.

In a further implementation, a method includes calculating an access success rate for each of a plurality of clients that attempt network access using an access number. A mean access success rate is calculated for the access number based on the calculated access success rates. A first average access success rate is calculated for the access number for a first set of the clients. Each of the clients in the first set has a respective access success rate Which is greater than or equal to the mean success rate. A second average access success rate is calculated for the access number for a second set of the clients, each having a respective access success rate which is less than or equal to the mean success rate. A skew factor is calculated as a number representation of a degree to which the first set of the clients predominate the second set of the clients. When the skew factor does not approximate zero, the mean access success rate is adjusted utilizing the skew factor.

BRIEF DESCRIPTION OF THE DRAWINGS

The same reference numbers are utilized in instances in the discussion to reference like structures and components.

DETAILED DESCRIPTION

Overview

Problems that drive customer dissatisfaction with access numbers, such as an access number utilized to access an Internet service provider, typically involve hang-ups and broken connections that are associated with the access number. This dissatisfaction made lead the customer to subscribe to a competitor's service, which results in lost market share and revenue of the service provider and frustration on the part of the customer. However, because a service provider may include a multitude of such access numbers that are available from a wide variety of locations, and because users may utilize a wide variety of computing devices to communicate via the access numbers, it may be difficult to determine which of the access numbers have sufficient quality such that users are not dissatisfied with their experience in accessing the service provider.

In an implementation, a technique is described for creating a metric, referred to as a "relative quality value", to quantify the quality of an access number. The metric may be utilized in a variety of ways, such as to rank the access numbers to eliminate one or more access numbers which create dissatisfaction, to choose access numbers for a particular user, and so on. In the following discussion, an exemplary environment is first described which is operable to provide the relative quality value. Exemplary procedures are then described which are suitable for being performed in the exemplary environment, as well as in other environments which employ access numbers.

Although the following techniques are described for use in relation to an access number, the relative quality value may be utilized in a variety of instances. For example, an environment may be provided where an entity (e.g., a system) provides a combination of functionally equivalent products to various subscribers, such that a subscriber may choose any given product from that combination at a given time. The different subscribers may experience different degrees of value (i.e., success) from each of the different products in the combination. The entity may use the feedback from each of these subscribers which describe their respective experience for any of their products and use the techniques described below to generate a relative quality value for each of the products in the combination and subsequently provide (e.g., suggest) the ones with the best value to the subscribers.

Exemplary Environment

Figure 1:
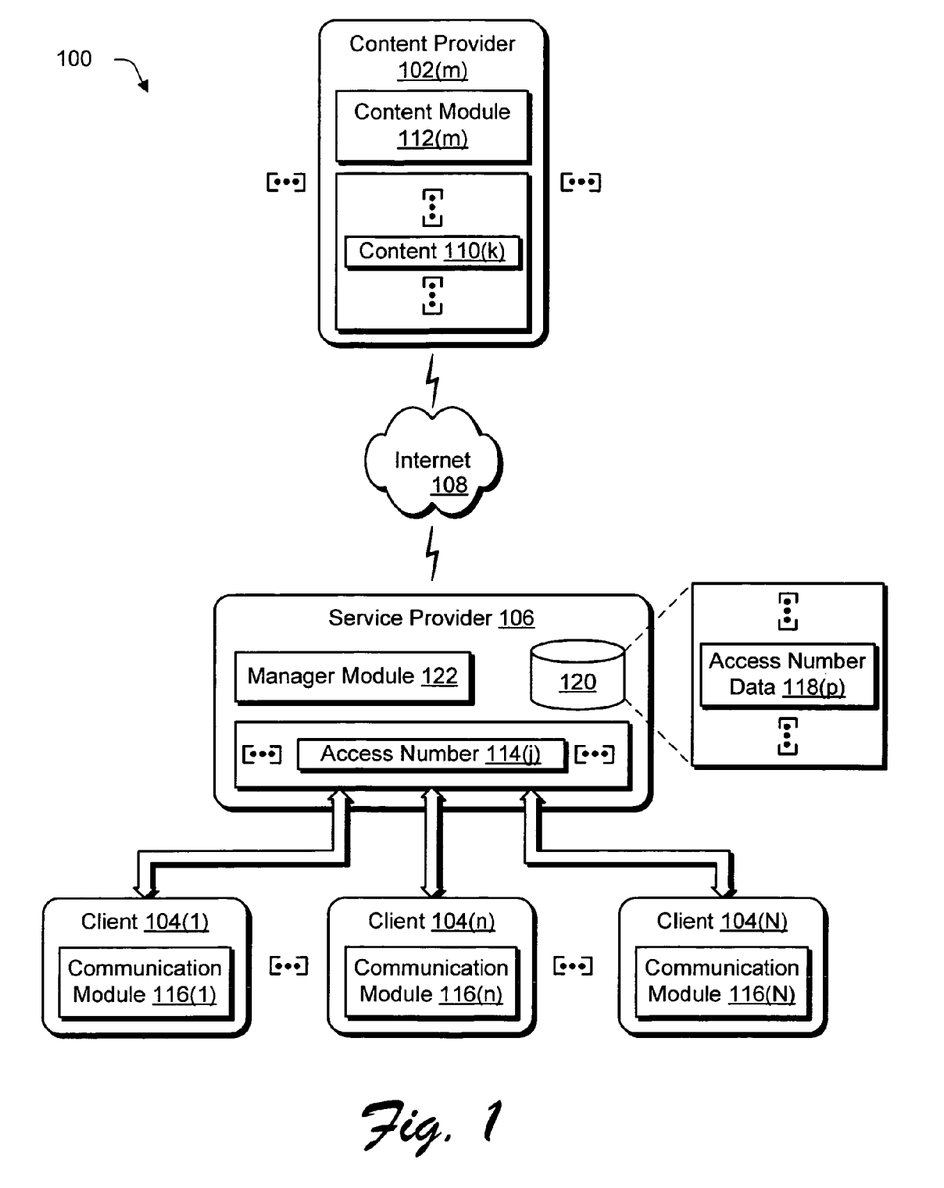
FIG. 1 is an illustration of an environment in an exemplary implementation that is operable to employ techniques for generating a relative quality value for access numbers.

FIG. 1 is an illustration of an environment 100 in an exemplary implementation that is operable to employ techniques for generating a relative quality value for access numbers. The illustrated environment 100 includes a plurality of content providers 102(m) (where "m" can be any integer from one to "M"), a plurality of clients 104(1), . . . , 104(n), . . . , 104(N), and a service provider 106. The clients 104(1)-104(N) may be configured in a variety of ways for accessing the service provider. For example, one or more of the clients 104(1)-104(N) may be configured as a computing device, such as a desktop computer, a mobile station, an entertainment appliance, a set-top box communicatively coupled to a display device, a wireless phone, a game console, and so forth. Thus, the clients 104(1)-104(N) may range from full resource devices with substantial memory and processor resources (e.g., personal computers, game consoles) to low-resource devices with limited memory and/or processing resources (e.g., traditional set-top boxes, hand-held game consoles). The clients 104(1)-104(N) may also relate to a person and/or entity that operate the clients. In other words, one or more of the clients 104(1)-104(N) may describe logical clients that include users, software, and/or devices.

The content provider 102(m) is illustrated as being communicatively coupled to the service provider 106 over a network configured as the Internet 108. Although the network is illustrated as the Internet 108, the network may assume a wide variety of configurations. For example, the network may include a wide area network (WAN), a wireless network, and so on. Further, although a single network is shown, the network may be configured to include multiple networks for access to the Internet 108, such as a corporate intranet that is configured to include a gateway to the Internet, and so on. A wide variety of other instances are also contemplated.

The content provider 102(m) includes a plurality of content 110(k), where "k" can be any integer from one to "K", which is available for access over the Internet 108. The content provider 102(m) is also illustrated as including a content module 112(m) which is executable to control access to the content 110(k). For example, the content module 112(m), when executed, may provide digital rights management, payment processing, location and communication of the content 110(k), and so on.

To gain access to the content 110(k) over the Internet 108, each of the plurality of clients 104(1)-104(N) obtains a communicative coupling with the service provider 106 via a corresponding one of a plurality of access numbers 114(j), where "j" can be any integer from one to "J". In this implementation, each of the access numbers 114(j) is a "dial-up" access number for accessing the service provider 106 over a telephone network. For example, each of the clients 104(1), 104(n), 104(N) may include a respective one of a plurality of communication modules 116(1), 116(n), 116(N). For instance, communication module 116(n), when executed by client 104(n), may utilize access number 114(j) to attempt access with the service provider 106.

Data describing the attempted access may be stored by the service provider as "access number data" 118(p), where "p" can be integer from one to "P", in a database 120. The access number data 118(p) may then be utilized by a manager module 122 to determine a relative quality of each of the plurality of access numbers 114(j) described by the access number data 118(p). For example, the manager module 122, when executed, may process the access number data 118(p) to arrive at a relative access value for each of the plurality of access numbers 114(j). The relative access values may function as "scores" for comparing quality of the plurality of access numbers 114(j), one to another. Thus, the service provider 106 may obtain an "understanding" of the relative quality of the access numbers 114(j), which may be utilized to optimize the selection of access numbers 114(j) for the plurality of clients 104(1)-104(N). Through optimization of the selection of access numbers 114(j) for use by the plurality of clients 104(1)-104(N), "churn" of the clients 104(1)-104(N) and technical support cost may both be reduced, thereby improving the clients 104(1)-104(N) experience with the service provider 106 and the overall profitability of the service provider 106. Further discussion of generation of relative access values may be found beginning in relation of FIG. 3.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the access number quality techniques described below are platform-independent, meaning that the techniques may be implemented on a variety of commercial computing platforms having a variety of processors. Although a service provider 106 configured as an internet service provider has been described, the service provider 106 may be configured to provide a wide variety of functionality through use of a plurality of access numbers.

Figure 2:
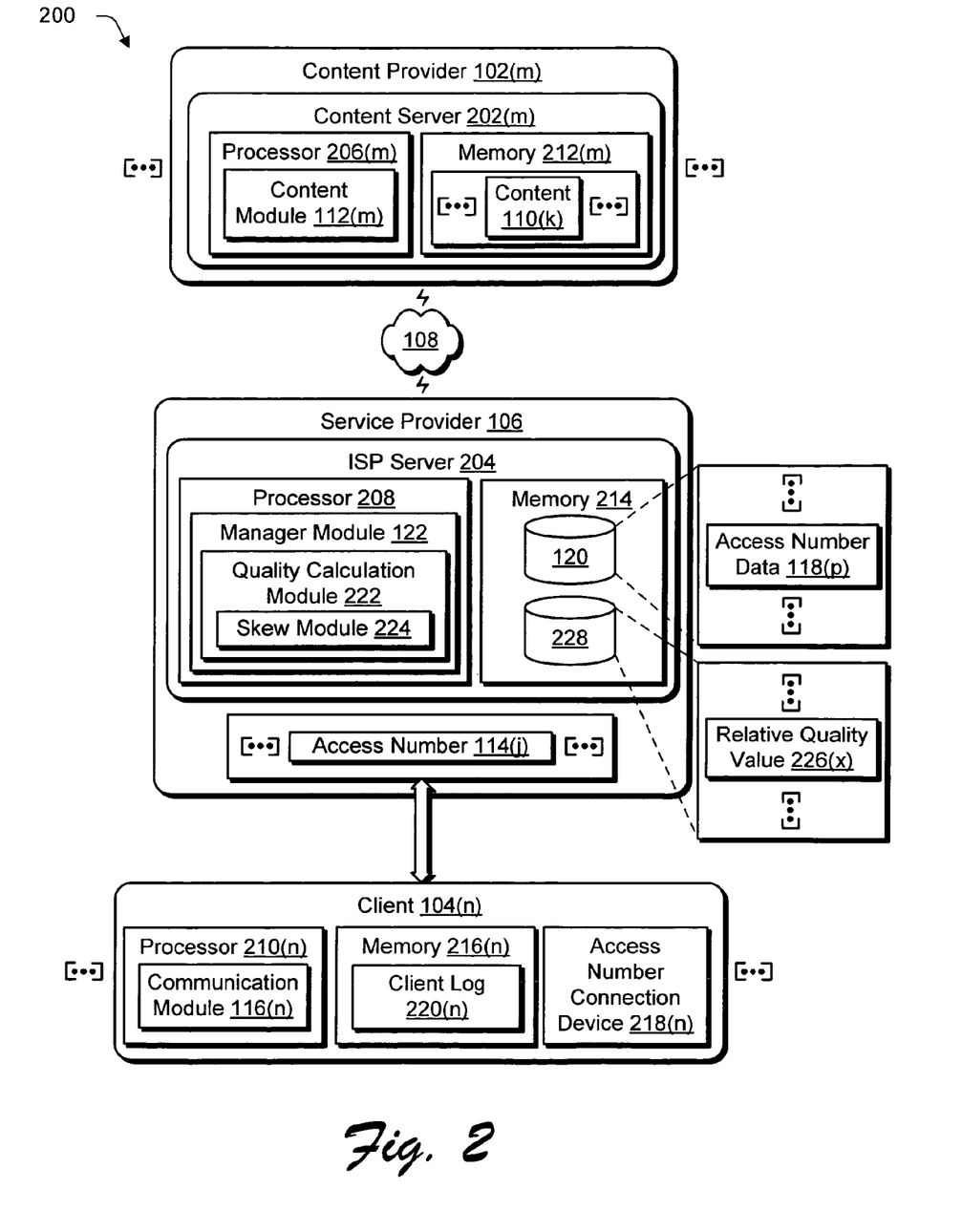
FIG. 2 is an illustration of a system in an exemplary implementation showing a content provider, a client, and a service provider of FIG. 1 in greater detail.

FIG. 2 is an illustration of a system 200 in an exemplary implementation showing the content provider 102(m), the client 104(n), and the service provider 106 of FIG. 1 in greater detail. The system 200 of FIG. 2 is representative of an exemplary network environment that is configured to implement the environment 100 of FIG. 1 through use of a variety of computing devices. For example, the content provider 102(m) is illustrated as including a content server 202(m) which is configured to provide content 110(k), such as web pages, downloadable songs, video-on-demand, results of remote application processing, email, instant messages, and so on. Service provider 106 is illustrated as including an Internet service provider (ISP) server 204 and the client 104(n) is illustrated as a client device. Accordingly, the content server 202(m), ISP server 204, and the client 104(n) are each illustrated as including a respective processor 206(m), 208, 210(n) and a respective memory 212(m), 214, 216(n).

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 212(m), 214, 216(n) is shown, respectively, for the content server 202(m), ISP server 204, and the client 104(n), each memory 212(m), 214, 216(n) may be representative of a wide variety of types and combinations of memory that may be employed, such as random access memory (RAM), hard disk memory, removable medium memory, and so forth.

The content provider 102(m) includes a content module 112(m) as previously described, which is illustrated as being executed on the processor 206(m) and is storable in memory 212(m). The content module 112(m), when executed, may be utilized to provide interaction with the content 110(k), such as to the client 104(n) via the service provider 106. The client 104(n) includes a communication module 116(n) which is illustrated as being executed on the processor 210(n) and is storable in memory 216(n). The communication module 116(n), when executed, may cause an access number connection device 218 to attempt a connection with the service provider 106 via one or more of the access numbers 114(j). The communication module 116(n) may also be executable to form a client log 220(n) which describes the connection attempts, such as when the connection was attempted, which of the plurality of access numbers 114(j) were attempted, a result of the attempt (e.g., successful, not successful), type of error encountered (if any), and so on. Further, the communication module 116(n) may be executed to communicate the client log 220(n) to the service provider 106.

The manager module 122 is illustrated as being executed on the processor 208 of the ISP server 204 of the service provider 106, and is storable in memory 214. The manager module 122, when executed, may obtain the client log 220(n) communicated by the client 104(n) and store the client log 220(n) in the database 120 as the access number data 118(p).

The manager module 122 is further illustrated as including a quality calculation module 222, which includes a skew module 224. The quality calculation module 222 is representative of functionality which is configured to examine the access number data 118(p) and generate a plurality of relative quality values 226(x) based on this examination. For example, the quality calculation module 222, when executed, may examine the access number data 118(p) and derive a relative quality value 226(x) for each of the plurality of access numbers 114(j) which are described in the access number data 118(p). The derived plurality of relative quality values 226(x) may then be stored in a database 228 for later retrieval.

During the calculation of the plurality of relative quality values 226(x), the quality calculation module 222 may employ the skew module 224. The skew module 224 is executable such that the resultant relative quality values 226(x) are not skewed by a client logs which are not consistent with a majority of the client logs received from the plurality of clients 104(n). For example, a minority of highly problematic clients can skew a quality rating of an access number for a population. Accordingly, the skew module 224 may be executed to account for this skew, and therefore provide accurate relative quality values 226(x) for the access numbers 114(j). Further discussion of the execution of the skew module 224 to calculate relative quality values may be found in relation to the following figures.

Exemplary Procedures

The following discussion describes access number quality calculation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
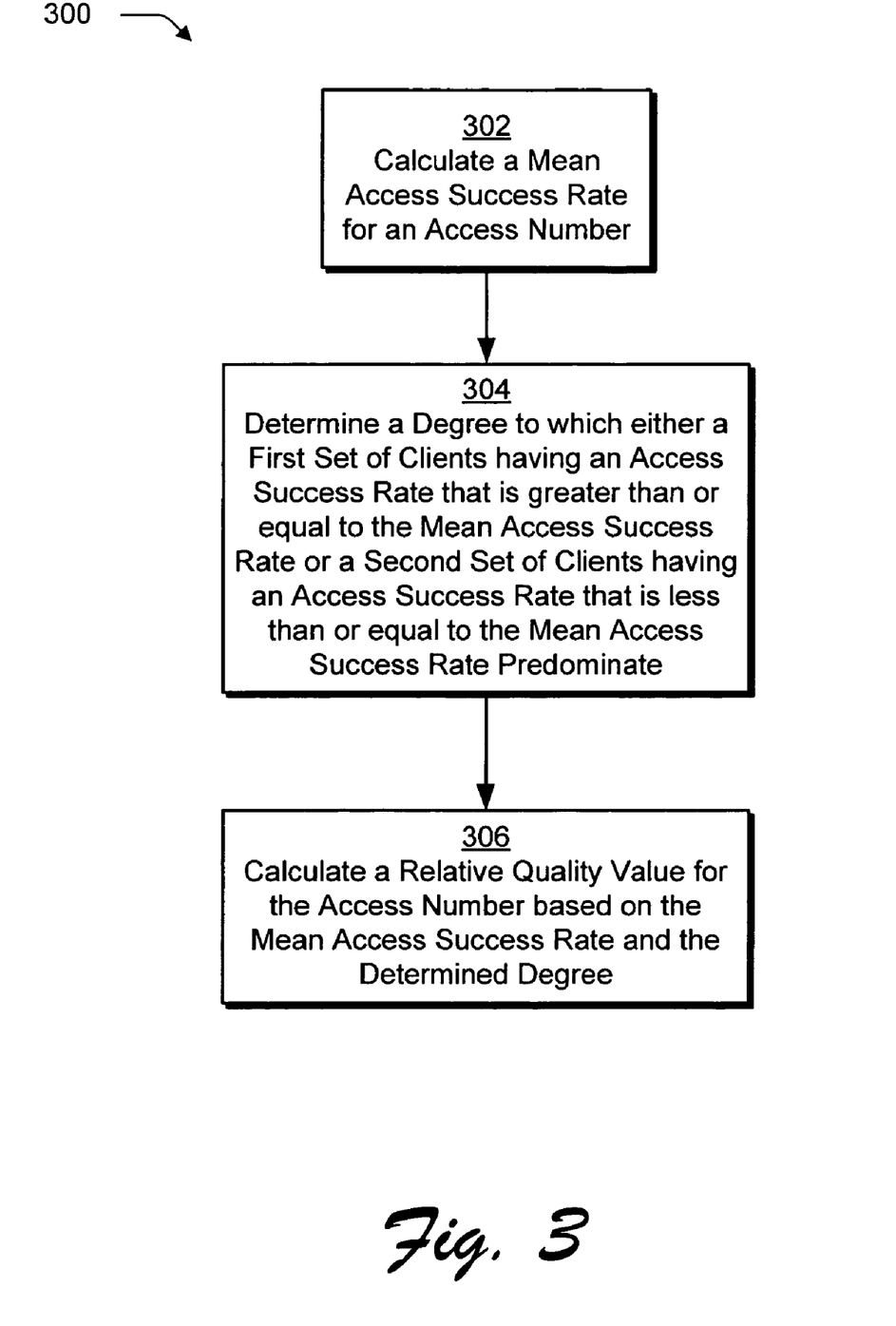
FIG. 3 is a flow diagram depicting a procedure in an exemplary implementation in which a relative quality value is calculated for an access number.

FIG. 3 is a flow diagram depicting a procedure 300 in an exemplary implementation a relative quality value is calculated for an access number. A mean access success rate is calculated for an access number (block 302). For example, the manager module 122 may execute the quality calculation module 222 to examine the plurality of access number data 118(p) for a particular access number 114(j). Based on this examination, the quality calculation module 222 may determine a rate at which an attempt at obtaining a connection between the service provider 106 and the plurality of clients 104(n) is successful, which may be referred to as an "access success rate". The "mean access success rate" may then be computed from the access success rates for the access number 114(j).

A degree is then determined, to which, either a first set of the clients having an access success rate that is greater than or equal to the mean access success rate or a second set of clients having an access success rate that is less than or equal to the mean access success rate predominate (block 304). For example, the degree may be calculated as a numerical representation of which type of client predominates a population of clients utilized to compute the mean access success rate, clients that are "happy" (i.e., clients having an access success rate that is greater than or equal to the mean access success rate) or "unhappy", i.e., clients having an access success rate that is less than or equal to the mean access success rate. The degree may be referred to as a "skew value", further discussion of which may be found in relation to FIG. 5.

A relative quality value is then calculated for the access number based on the mean access success rate and the determined degree (block 306). For example, the determined degree (i.e., the skew value) may be utilized to adjust the mean access success rate to arrive at the relative quality value. In this way, the relative quality value may more accurately reflect the expected experience of the population of clients with the access number by limiting a skew in the value caused by uncommon experiences. For example, a single subscriber may account for a vast majority of errors for a particular access number, and therefore, this single subscriber may cause a mean score for the particular access number to indicate that it is less effective than what is typically encountered. Therefore, the skew value may be applied to arrive at a relative quality value that has the effect caused by the single subscriber reduced to more accurately reflect the experience of the clients on the access number.

Figure 4:
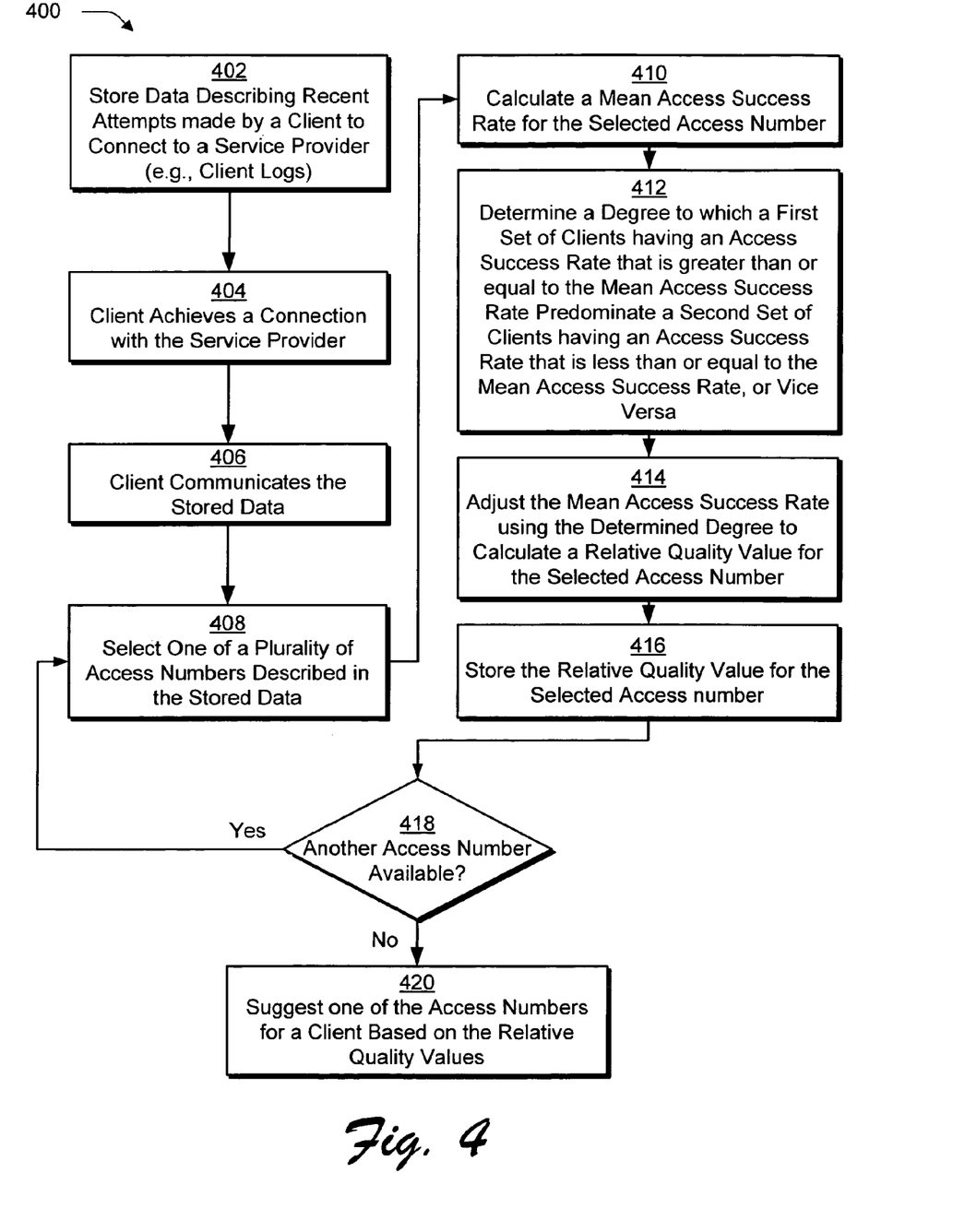
FIG. 4 is a flow diagram depicting a procedure in an exemplary implementation in which data which describes attempts made by a plurality of clients to connect to a service provider is utilized to calculate relative quality values for a plurality of access numbers.

FIG. 4 is a flow diagram depicting a procedure 400 in an exemplary implementation in which data which describes attempts made by a plurality of clients to connect to a service provider is utilized to calculate relative quality values for a plurality of access numbers. Data is stored which describes one or more recent attempts made by a client to connect to a service provider (block 402). For example, client 104(n) may store a client log 220(n) which describes each attempt made by the client 104(n) over a measurement interval. Client 104(n), for instance, may make five successive attempts to connect to the service provider 106 using access number 114(j) until a successful connection is made. In other words, the client 104(n) had four failed attempts and once successful attempt in this instance. Therefore, the client 104(n) may store data in the client log 220(n) which describes all five attempts, such as when attempted, which access number 114(j), error code encountered (if any), and so on.

Once the client achieves a connection with the service provider (block 404), the client may communicate the stored data (block 406). For example, upon the fifth attempt, the client 104(n) may obtain a communicative coupling with the service provider 106. The client 104(n) may then "post" the client log 220(n) to a web page, which may then be retrieved by the service provider 106 and stored as access number data 118(p). The service provider 106 may collect a plurality of such posts from a plurality of clients (e.g., clients 104(1), 104(N)) and store the information as access number data 118(p).

One of a plurality of access numbers described in the stored data is then selected (block 408). For example, the manager module 122 may examine the access number data 118(p) to locate one of the plurality of access numbers 114(j) that are described by the access number data 118(p). A mean access success rate is then calculated for the selected access number (block 410). For example, an access success rate may be calculated for each of the plurality of clients 104(1)-104(N) which attempted access with the service provider 106 via access number 114(j) and provided a corresponding client log which describes these attempts. The mean access success rate may then be computed from these access success rates.

A determination is then made as to a degree, at which, a first set of the clients having an access success rate that is greater than or equal to the mean access success rate predominate a second set of clients having an access success rate that is less than or equal to the mean access success rate (block 412), or vice versa. The mean access success rate is then adjusted using the determined degree to calculate a relative quality value for the selected access number (block 414). The relative quality value 226(x) for the selected access number is then stored (block 416).

A determination is then made as to whether another access number is available (decision block 418). For example, the quality calculation module 222 may again examine the access number data 118(p) to determine if another one of the plurality of access numbers 114(j) are described. The procedure 400 may continue for each other access number 114(j) that is described by the access number data 118(p) by calculating a mean access success rate for the other access number, determining the degree, and calculating and storing the relative quality value (blocks 408-416). When another access number is not available (decision block 418), one of the access numbers is suggested for a client based on the relative quality values (block 420). For example, the relative quality values may be utilized for comparison of the access numbers, one to another. For instance, the manager module 122 may output a phone book for communication to the client 104(n) which includes one or more of the access numbers 114(j) which are selected for the client 104(n) based on the relative quality values. The communication module 116(n) may then utilize the phone book to select an access number for forming a connection with the service provider 106. The relative quality values 226(x) may be utilized in a wide variety of other ways without departing from the spirit and scope thereof.

Figure 5:
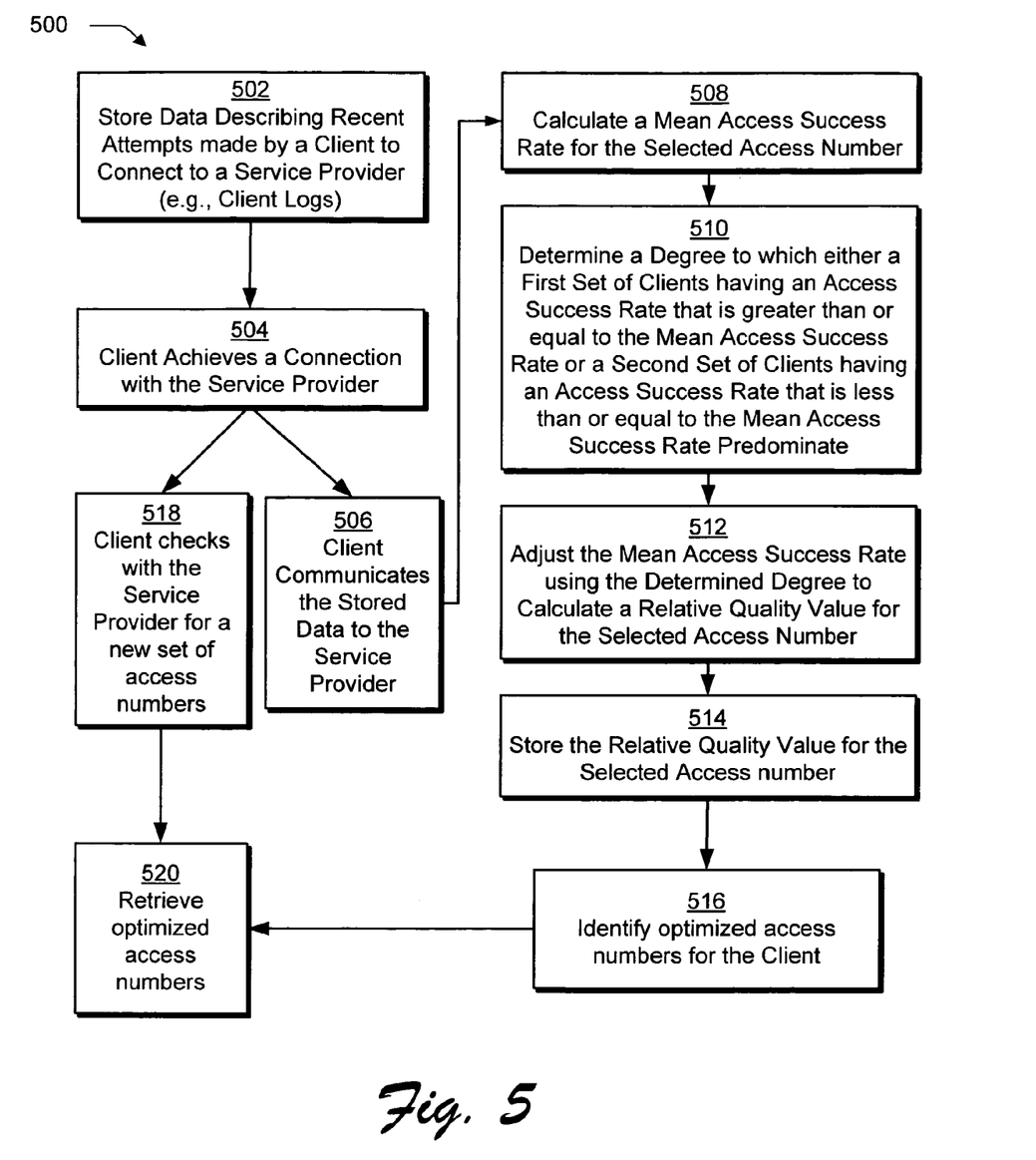
FIG. 5 is a flow diagram depicting a procedure in an exemplary implementation in which data is collected from a client to calculate a relative quality value, which is then utilized to identify optimized access numbers for the client.

FIG. 5 is a flow diagram depicting a procedure 500 in an exemplary implementation in which data is collected from a client to calculate a relative quality value, which is then utilized to identify optimized access numbers for the client. Data is stored which describes recent attempts made by a client to connect to a service provider (block 502). For example, the data may be configured as a client log as previously described.

The client achieves a connection with the service provider (block 504) and communicates the stored data to the service provider (block 506). A mean access success rate is then calculated for the selected access number (block 508). As previously described, an access success rate may be calculated for each of the plurality of clients which attempted access with the service provider via the access number and provided a corresponding client log which describes these attempts. The mean access success rate may then be computed from these access success rates.

A degree is determined, to which, either a first set or a second set of the clients predominate (block 510). The first set of clients has an access success rate that is greater than or equal to the mean access success rate. The second set of clients has an access success rate that is less than or equal to the mean access success rate.

The mean access success rate is then adjusted using the determined degree to calculate a relative quality value for the select access number (block 512), which is then stored for the selected access number (block 514). Optimized access numbers are then identified for the client based on the relative quality values (block 516). Therefore, when the client checks with the service provider for a new set of access numbers (block 518) the optimized access numbers may be retrieved (block 520) for use by the client, or another client.

Figure 6:
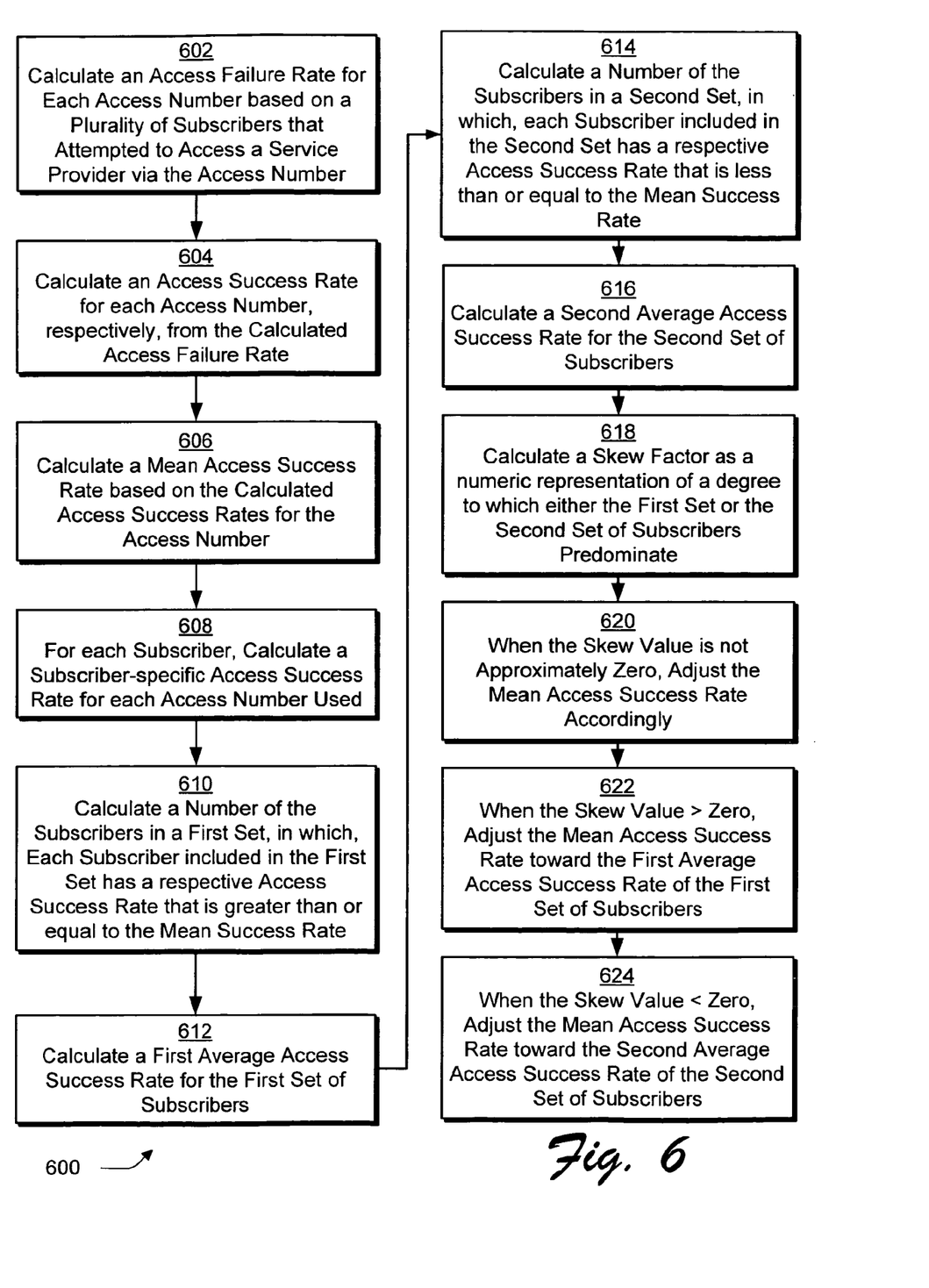
FIG. 6 is a flow diagram depicting a procedure in an exemplary implementation in which a skew factor is calculated and utilized to adjust a mean access success rate.

FIG. 6 is a flow diagram depicting a procedure 600 in an exemplary implementation in which a skew factor is calculated and utilized to adjust a mean access success rate. An access failure rate is calculated for each of a plurality of access numbers based on a plurality of subscribers that attempted to access a service provider via the access number (block 602) over a measurement interval. For example, the plurality of access numbers may be configured for use by the plurality of subscribers (e.g., clients having a subscription with the service provider) to access the Internet. An attempt which fails to produce a successful connection to the Internet via the access number is referred to as a "failure". Failures may be encountered due to a wide variety of errors, such as network errors (e.g., line is busy, no dial tone), service provider errors (e.g., no answer, point-to-point protocol negotiation is not converging, point-to-point protocol link control is terminated, failed connection attempt because a modem of the service provider is out of order, and so on), and client errors (e.g., access number connection device is not available, and so on). Thus, an access failure rate is a rate at which attempts to connect via an access number fail to produce a successful connection over the measurement interval, i.e., a period of time during which access number activity is evaluated.

An access success rate is then calculated for each access number, respectively, from the calculated access failure rate (block 604). An attempt which results in a successful connection is deemed a "success". Therefore, the access success rate describes a rate at which attempted connections with the service provider via the access number result in a successful connection. The access success rate may be computed as one minus the access failure rate.

A mean access success rate is then calculated for the access number based on the calculated access success rates (block 606). For example, the mean access success rate may describe an average of each of the individual subscriber's access success rates for the access number over the measurement interval.

For each subscriber, a subscriber-specific access success rate is calculated for each access number used (block 608). A number of the subscribers included in a first set of subscribers is calculated. Each subscriber in the first set has a respective access success rate that is greater than or equal to the mean success rate (block 610). Such subscribers may also be referred to as "happy" subscribers in that each of these subscribers has an experience with the access number that is greater than or equal to the average experience of the plurality of subscribers. A first average access success rate is calculated for the first set of subscribers (block 612). Thus, the first average access success rate describes an average success rate for all "happy" subscribers for the access number over the measurement interval.

A number of the subscribers included in a second set of clients is also calculated. Each subscriber in the second set has a respective access success rate that is less than or equal to the mean success rate (block 614). In this instance, such subscribers are referred to as "unhappy" subscribers in that each of these subscribers has an experience with the access number that is less than or equal to the average experience of the plurality of subscribers. A second average access success rate is calculated for the second set of subscribers (block 616). Thus, the second average access success rate describes an average success rate for all "unhappy" subscribers for the access number over the measurement interval.

A skew value is then calculated as a numeric representation of a degree, to which, either the first set of subscribers or the second set of clients (block 618) predominate. The skew value may be computed in a variety of ways, such as from the number of subscribers in the first set minus the number of subscribers in the second set, a result of which is divided by a total number of subscribers. In this instance, a positive skew value indicates the population of subscribers includes more "happy" subscribers than "unhappy" subscribers. Likewise, a negative skew value indicates the population of subscribers includes more "unhappy" subscribers than "happy" subscribers.

When the skew value is not approximately zero, the mean access success rate is adjusted accordingly (block 620). For example, when the skew value is greater than zero, the mean access success rate is adjusted toward the first average success rate of the first set of subscribers (block 622). The adjustment, for instance, may be computed such that the mean access success rate is subtracted from the first average access success rate, a result of which is multiplied by the skew value and added to the mean access success rate. The result of this computation is a relative quality value for the access number.

Likewise, when the skew value is less than zero, the mean access success rate is adjusted toward the second average success rate of the second set of subscribers (block 624). The adjustment, for instance, may be computed such that the second average access success rate is subtracted from the mean access success rate, a result of which is multiplied by the skew value and added to the mean access success rate. The result of this computation is also a relative quality value for the access number which reflects the predominance of "happy" versus "unhappy" subscribers.

Although this exemplary implementation described an adjustment based on whether the skew factor was greater than or less than zero, the adjustment may also be made through use of a threshold. For example, the threshold may be utilized to define a minimum amount of skew, for which, the mean access success rate will be adjusted. Thus, in such an instance the adjustment may be made when the skew factor approximates a zero value. The threshold may be computed in a wide variety of ways, such as dynamically (e.g., based on available computation resources, heuristics, and so on), predetermined by an administrator, and so on.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented on a computing device by a processor configured to execute instructions that, when executed on the processor, direct the computing device to perform acts comprising:
    calculating an access success rate for a plurality of clients for utilizing an access number to access a service provider, by a quality calculation module, wherein:
        a first set of clients have respective access success rates that are greater than or equal to the access success rate for the plurality of clients; and
        a second set of clients have respective access success rates that are less than or equal to the access success rate for the plurality of clients; and
    adjusting the access success rate based on a degree, to which, either the first set or the second set of clients predominate, wherein the degree is determined by a skew module comprising:
        calculating a first number of clients included in the first set of clients;
        calculating a second number of clients included in the second set of clients; and
        calculating the degree as a skew factor by subtracting the second number from the first number, a result of which is divided by a total number of the plurality of clients.

2. A method as described in claim 1, wherein the access success rate is a mean success rate for the plurality of clients.

3. A method as described in claim 1, wherein the adjusted access success rate is a relative quality value that is configured for comparison with another relative quality value which corresponds with another access number.

4. A method as described in claim 1, wherein the degree is a skew value which includes a numerical representation of the predomination of the first set of clients with respect to the second set of clients in a total population which includes the plurality of clients.

5. A method as described in claim 1, wherein the adjusting the access success rate based on a degree further comprises:
    if the skew value is greater than zero adjusting the mean access success rate toward a first average access success rate for the first set of clients by subtracting the mean access success rate from the first average access success rate, a result of which is multiplied by the skew value and added to the mean access success rate; and
    if the skew value is less than zero adjusting the mean access success rate toward a second average access success rate for the second set of clients by subtracting the second average access success rate from the mean access success rate, a result of which is multiplied by the skew value and added to the mean access success rate.

6. A method as described in claim 1, further comprising obtaining a plurality of client logs from the plurality of clients over a network, wherein:
- one or more client logs describe connection attempts of the plurality of clients to access the service provider utilizing the access number; and
- the calculating of the access success rate is performed based at least in part on the one or more client logs.

7. A method as described in claim 1, wherein:
- the service provider is an Internet service provider; and
- the access number is a telephone number.

8. One or more computer readable storage media comprising computer executable instructions that, when executed on a processor of a computer, direct the computer to perform the method as recited in claim 1.

9. A method implemented on a computing device by a processor configured to execute instructions that, when executed on the processor, direct the computing device to perform acts comprising:
- calculating a mean access success rate for a plurality of products utilized by a plurality of clients, by a quality calculation module;
- for each product, determining a degree to which a first set of clients having a success rate that is greater than or equal to the mean access success rate or a second set of clients having a success rate that is less than or equal to the mean access success rate predominate, wherein the determining the degree comprises:
  - calculating a first number of clients included in the first set of clients;
  - calculating a second number of clients included in the second set of clients; and
  - calculating the degree as a skew factor by subtracting the second number from the first number, a result of which is divided by a total number of the plurality of clients; and
- for each product, calculating a relative quality value based on the mean access success rate and the degree.

10. A method as described in claim 9, wherein the determined degree is a numerical representation of a skew value.

11. A method as described in claim 9, wherein the calculating a relative quality value based on the mean access rate and the degree further comprises:
- if the skew value is greater than zero adjusting the mean success rate toward a first average success rate for the first set of clients by subtracting the mean success rate from the first average success rate, a result of which is multiplied by the skew value and added to the mean success rate; and
- if the skew value is less than zero adjusting the mean success rate toward a second average success rate for the second set of clients by subtracting the second average success rate from the mean success rate, a result of which is multiplied by the skew value and added to the mean success rate.

12. A method as described in claim 9, further comprising obtaining a plurality of client logs from the plurality of clients over a network, wherein:
- one or more client logs describe access attempts of the plurality of clients to utilize one or more products; and
- the calculating of the access success rate is performed based at least in part on the one or more client logs.

13. One or more computer readable storage media comprising computer executable instructions that, when executed on a processor of a computer, direct the computer to perform the method as recited in claim 9.

14. A method implemented on a computing device by a processor configured to execute instructions that, when executed on the processor, direct the computing device to perform acts comprising:
- calculating an access success rate for each of a plurality of clients that attempt network access using an access number, by a quality calculation module;
- calculating a mean access success rate for the access number based on the calculated access success rates;
- calculating a first average access success rate for the access number for a first set of clients, each client in the first set having a respective access success rate which is greater than or equal to the mean success rate;
- calculating a second average access success rate for the access number for a second set of clients having a respective access success rate which is less than or equal to the mean success rate;
- calculating a skew factor as a number representation of a degree to which the first set of clients predominate the second set of clients, wherein the calculating the skew factor comprises:
  - calculating a first number of clients included in the first set;
  - calculating a second number of clients included in the second set;
  - calculating the skew factor by subtracting the second number from the first number, a result of which is divided by a total number of the plurality of clients; and
- when the skew factor is not zero, adjusting the mean access success rate utilizing the skew factor.

15. A method as described in claim 14, wherein the calculating of the access success rate includes calculating an access failure rate for each of the plurality of clients.

16. A method as described in claim 14, wherein the adjusting comprises:
- if the skew value is greater than zero adjusting the mean access success rate toward the first average access success rate; and
- if the skew value is less than zero adjusting the mean access success rate towards the second average access success rate.

17. A method as described in claim 16, wherein:
- the mean access success rate is adjusted toward the first average access success rate by subtracting the mean access success rate from the first average access success rate, a result of which is multiplied by the skew value and added to the mean access success rate; and
- the mean access success rate is adjusted toward the second average access success rate by subtracting the second average access success rate from the mean access success rate, a result of which is multiplied by the skew value and added to the mean access success rate.

18. A method as described in claim 14, further comprising obtaining a plurality of client logs from the plurality of clients over a network, wherein:
- one or more client logs describe network access attempts of the plurality of clients; and
- the calculating of the access success rate is performed based at least in part on the one or more client logs.

19. One or more computer readable storage media comprising computer executable instructions that, when executed on a processor of a computer, direct the computer to perform the method as recited in claim 14.

* * * * *